United States Patent
Brown et al.

(10) Patent No.: US 8,918,457 B2
(45) Date of Patent: Dec. 23, 2014

(54) OPTIMIZING IT INFRASTRUCTURE CONFIGURATION

(71) Applicant: International Business Machines Corporation, Armonk, NY (US)

(72) Inventors: Jennifer B. Brown, Berlin, MD (US); Paul T. Dimarzio, Bethel, CT (US); Timothy Durniak, Poughkeepsie, NY (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/887,976

(22) Filed: May 6, 2013

(65) Prior Publication Data

US 2013/0246123 A1    Sep. 19, 2013

Related U.S. Application Data

(63) Continuation of application No. 12/835,259, filed on Jul. 13, 2010, now Pat. No. 8,478,879.

(51) Int. Cl.
| | |
|---|---|
| *G06F 15/16* | (2006.01) |
| *G06Q 10/06* | (2012.01) |
| *G06F 17/30* | (2006.01) |
| *G06Q 30/02* | (2012.01) |
| *H04L 29/06* | (2006.01) |
| *H04L 29/08* | (2006.01) |

(52) U.S. Cl.
CPC ........ *G06Q 10/063* (2013.01); *G06F 17/30864* (2013.01); *H04L 29/06* (2013.01); *G06F 17/30* (2013.01); *H04L 29/08* (2013.01); *G06Q 10/06* (2013.01); *G06Q 30/0201* (2013.01)
USPC ........... 709/203; 707/794; 717/140; 705/7.28

(58) Field of Classification Search
None
See application file for complete search history.

(56) References Cited

U.S. PATENT DOCUMENTS

| | | | | |
|---|---|---|---|---|
| 5,784,539 | A | * | 7/1998 | Lenz .............................. 706/45 |
| 6,067,545 | A | * | 5/2000 | Wolff ................................. 1/1 |
| 7,135,956 | B2 |   | 11/2006 | Bartone et al. |

(Continued)

OTHER PUBLICATIONS

H. Fujimaki et al., "Fujitsu's Primergy BX620 S4 Blade Server for Solving Server Consolidation Problems", Fujitsu Ltd., Fujitsu Scientific and Technical Journal, vol. 44, No. 1, pp. 19-26, Jan. 2008.

(Continued)

*Primary Examiner* — Gurkanwaljit Singh
(74) *Attorney, Agent, or Firm* — John R. Pivnichny; Law Office of Jim Boice

(57) ABSTRACT

A computer implemented method optimizes a configuration of an information technology (IT) infrastructure. A processor establishes a technology rule set, which defines technology weights of an IT infrastructure by mapping capabilities of IT infrastructure components to IT infrastructure attributes needed to execute a specific workload. A candidate IT infrastructure for executing the specific workload is then configured. The processor then receives responses, provided by a customer, to an attribute questionnaire. Each question in the attribute questionnaire is mapped to an IT infrastructure attribute of the candidate IT infrastructure, and the responses define a customer's level of agreement/disagreement with the technology weights. In response to the processor determining that the candidate IT infrastructure fails to meet the customer's expectations, the candidate IT infrastructure is reconfigured until the customer's expectations are met.

20 Claims, 7 Drawing Sheets

(56) References Cited

U.S. PATENT DOCUMENTS

| | | |
|---|---|---|
| 7,296,256 B2 * | 11/2007 | Liu et al. ............... 717/104 |
| 2002/0107864 A1 * | 8/2002 | Battas et al. ............ 707/101 |
| 2002/0107957 A1 * | 8/2002 | Zargham et al. ......... 709/224 |
| 2002/0138643 A1 * | 9/2002 | Shin et al. .............. 709/232 |
| 2002/0198751 A1 * | 12/2002 | Ernest et al. ............... 705/7 |
| 2003/0074401 A1 * | 4/2003 | Connell et al. .......... 709/203 |
| 2004/0210445 A1 * | 10/2004 | Veronese et al. ........... 705/1 |
| 2004/0221038 A1 * | 11/2004 | Clarke et al. ........... 709/226 |
| 2005/0096949 A1 | 5/2005 | Aiber et al. |
| 2005/0222931 A1 * | 10/2005 | Mamou et al. ............ 705/35 |
| 2006/0092903 A1 * | 5/2006 | Tayloe et al. ............ 370/342 |
| 2006/0129745 A1 * | 6/2006 | Thiel et al. .............. 711/100 |
| 2006/0161444 A1 * | 7/2006 | Lubrecht et al. ............ 705/1 |
| 2006/0174037 A1 * | 8/2006 | Bernardi et al. ......... 709/245 |
| 2007/0038648 A1 | 2/2007 | Chetwood et al. |
| 2007/0061191 A1 * | 3/2007 | Mehrotra et al. .......... 705/11 |
| 2007/0100930 A1 * | 5/2007 | Moon et al. ............. 709/200 |
| 2007/0192406 A1 | 8/2007 | Frietsch et al. |
| 2007/0250829 A1 * | 10/2007 | Hillier et al. ............ 717/170 |
| 2008/0040364 A1 * | 2/2008 | Li ........................... 707/100 |
| 2008/0052719 A1 * | 2/2008 | Briscoe et al. ........... 718/104 |
| 2008/0077530 A1 * | 3/2008 | Banas et al. ............. 705/50 |
| 2008/0120129 A1 * | 5/2008 | Seubert et al. ............. 705/1 |
| 2008/0127133 A1 * | 5/2008 | Aghara et al. ........... 717/140 |
| 2008/0270205 A1 * | 10/2008 | Kumar et al. ............... 705/7 |
| 2008/0301783 A1 * | 12/2008 | Abrutyn et al. ............. 726/5 |
| 2008/0312979 A1 * | 12/2008 | Lee et al. .................. 705/7 |
| 2009/0006850 A1 * | 1/2009 | Birger et al. ............. 713/169 |
| 2009/0018882 A1 * | 1/2009 | Burton et al. .............. 705/7 |
| 2009/0150472 A1 * | 6/2009 | Devarakonda et al. ....... 709/201 |
| 2009/0307174 A1 | 12/2009 | Devarakonda et al. |
| 2009/0307508 A1 | 12/2009 | Curtis et al. |
| 2009/0313631 A1 | 12/2009 | De Marzo et al. |
| 2010/0017244 A1 * | 1/2010 | Saha et al. ................. 705/8 |
| 2010/0017782 A1 | 1/2010 | Chaar et al. |
| 2010/0070291 A1 * | 3/2010 | Handy ..................... 705/1.1 |
| 2010/0274596 A1 * | 10/2010 | Grace et al. ................ 705/7 |
| 2011/0126099 A1 * | 5/2011 | Anderson et al. ......... 715/704 |

OTHER PUBLICATIONS

V. Frei, "Which Styleguides IT Companies Regulate", Iks E. V., Sprache Und Datenverarbeitung, vol. 32, No. 2, pp. 27-51, 2008.

PTAK, Noel & Associates, "Optimize Resources and Services to Meet Business Goals", pp. 1-4, 2005.

IBM, "IT Optimization to Meet Business Goals", IBM, pp. 1-5, Jan. 2007.

IBM Global Services, "IT Optimization: Driving Infrastructure Value", IBM Global Services, pp. 1-4, 2005.

A. Gillen et al., "Optimizing Infrastructure: The Relationship Between IT Labor Costs and Best Practices for Managing the Windows Desktop", IDC, pp. 1-4, 2006.

A. Lachenmann et al., "Meeting Lifetime Goals With Energy Levels", Sensys'07, ACM, pp. 131-144, Nov. 2007.

U.S. Appl. No. 12/835,259—Non-Final Office Action Mailed Mar. 1, 2012.

U.S. Appl. No. 12/949,956—Non-Final Office Action Mailed May 22, 2014.

\* cited by examiner

OPTIMIZING IT INFRASTRUCTURE CONFIGURATION

The present application is a continuation of U.S. patent application Ser. No. 12/835,259, filed on Jul. 13, 2010, and entitled, "Optimizing IT Infrastructure Configuration," which is incorporated herein by reference.

BACKGROUND

The present disclosure relates to the field of computers, and specifically to the configuration of computers and computer systems. Still more particularly, the present disclosure relates to optimizing computer system configurations to meet both workload requirements and customer preferences.

SUMMARY

A computer implemented method, system, and/or computer program product optimize a configuration of an information technology (IT) infrastructure. A processor establishes a technology rule set, which defines technology weights of an IT infrastructure by mapping capabilities of IT infrastructure components to IT infrastructure attributes needed to execute a specific workload. A candidate IT infrastructure for executing the specific workload is configured. The processor then receives responses, provided by a customer, to an attribute questionnaire. Each question in the attribute questionnaire is mapped to an IT infrastructure attribute of the candidate IT infrastructure, and the responses define a customer's level of agreement/disagreement with the technology weights. In response to the processor determining that the candidate IT infrastructure fails to meet the customer's expectations, the candidate IT infrastructure is reconfigured until the customer's expectations are met.

DETAILED DESCRIPTION

Figure 1:
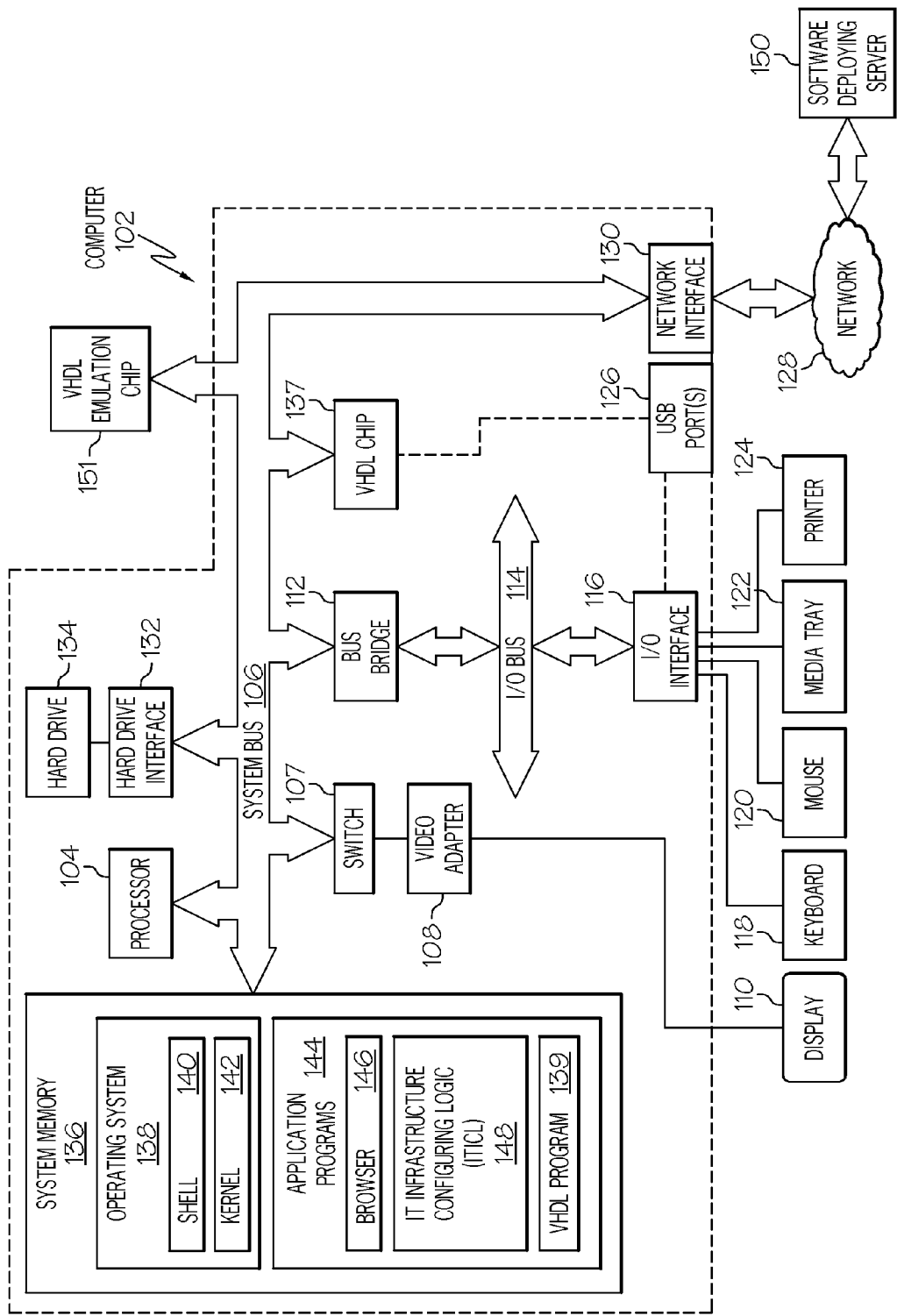
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., information technology infrastructure configuring logic—ITICL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an information technology infrastructure configuring logic (ITICL) 148. ITICL 148 includes code for implementing the processes described below, including those described in FIGS. 2-7. In one embodiment, computer 102 is able to download ITICL 148 from software deploying server 150, including in an on-demand basis, wherein the code in ITICL 148 is not downloaded until needed for execution to define and/or implement the improved enterprise architecture described herein. Note further that, in one embodiment of the present invention, software deploying server 150 performs all of the functions associated with the present invention (including execution of ITICL 148), thus freeing computer 102 from having to use its own internal computing resources to execute ITICL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from ITICL 148 causes VHDL program 139 to configure VHDL chip 137, which may be an FPGA, ASIC, etc.

In another embodiment of the present invention, execution of instructions from ITICL 148 results in a utilization of VHDL program 139 to program a VHDL emulation chip 151. VHDL emulation chip 151 may incorporate a similar architecture as described above for VHDL chip 137. Once ITICL 148 and VHDL program 139 program VHDL emulation chip 151, VHDL emulation chip 151 performs, as hardware, some or all functions described by one or more executions of some or all of the instructions found in ITICL 148. That is, the VHDL emulation chip 151 is a hardware emulation of some or all of the software instructions found in ITICL 148. In one embodiment, VHDL emulation chip 151 is a programmable read only memory (PROM) that, once burned in accordance with instructions from ITICL 148 and VHDL program 139, is permanently transformed into a new circuitry that performs the functions needed to perform the process described below in FIGS. 2-7.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
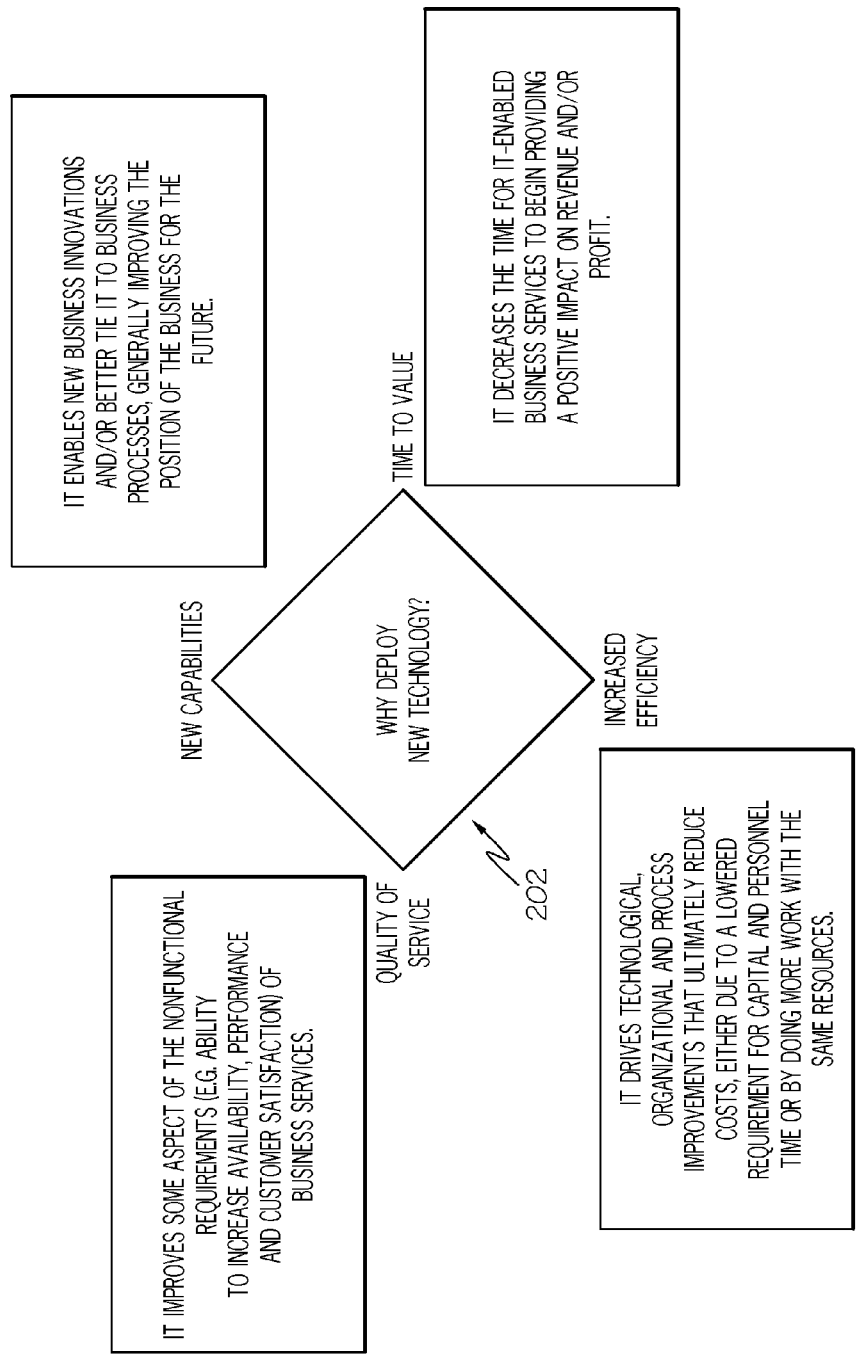
FIG. 2 illustrates exemplary customer-weighted attributes to be applied to a newly configured/optimized information technology (IT) infrastructure.

With reference now to FIG. 2, exemplary customer-weighted attributes of an information technology (IT) infrastructure are depicted on a graph 202. Graph 202 presents an overview of reasons for a customer to configure/reconfigure/deploy an IT infrastructure. For example, a customer may desire to deploy a new IT infrastructure in order to provide new capabilities to an enterprise. These new capabilities may enable new business innovations and/or better tie IT to business processes, thus generally improving the position of the business for the future. These new capabilities provide improved business capabilities (e.g., a reduction in management interfaces), improved IT capabilities (e.g., enable increased IT integration), etc.

A customer may desire to improve time to value, in which the new technology decreases the time for IT-enabled business services to begin providing a positive impact on revenue and/or profit. This results in faster capability deployment (e.g., reduced test cycle); improved quality of deployment (e.g., more accurate installation); improved ability to change dynamically (e.g., reduced complexity of change), etc.

A customer may desire to deploy new technology in order to increase efficiency. Thus, deploying the new technology may drive technological, organizational and process improvements that ultimately reduce costs, either due to a lowered requirement for capital and personnel time or by doing more work with the same resources. This increased efficiency results in improved technology efficiency (e.g., increased server utilization); improved organization efficiency (e.g., reduced/eliminated tasks); improved process efficiency (e.g., reduced error rates), etc.

The customer may desire to deploy new technology in order to improve an enterprise's quality of service. Thus, deploying the new technology may improve some aspect of the non-functional requirements (e.g. ability to increase availability, performance and customer satisfaction) of business services. This may result in improved availability of IT resources (e.g., fewer outages); increased performance (e.g., improved response time); improved customer satisfaction (e.g., more consistent service levels), etc.

Figure 3:
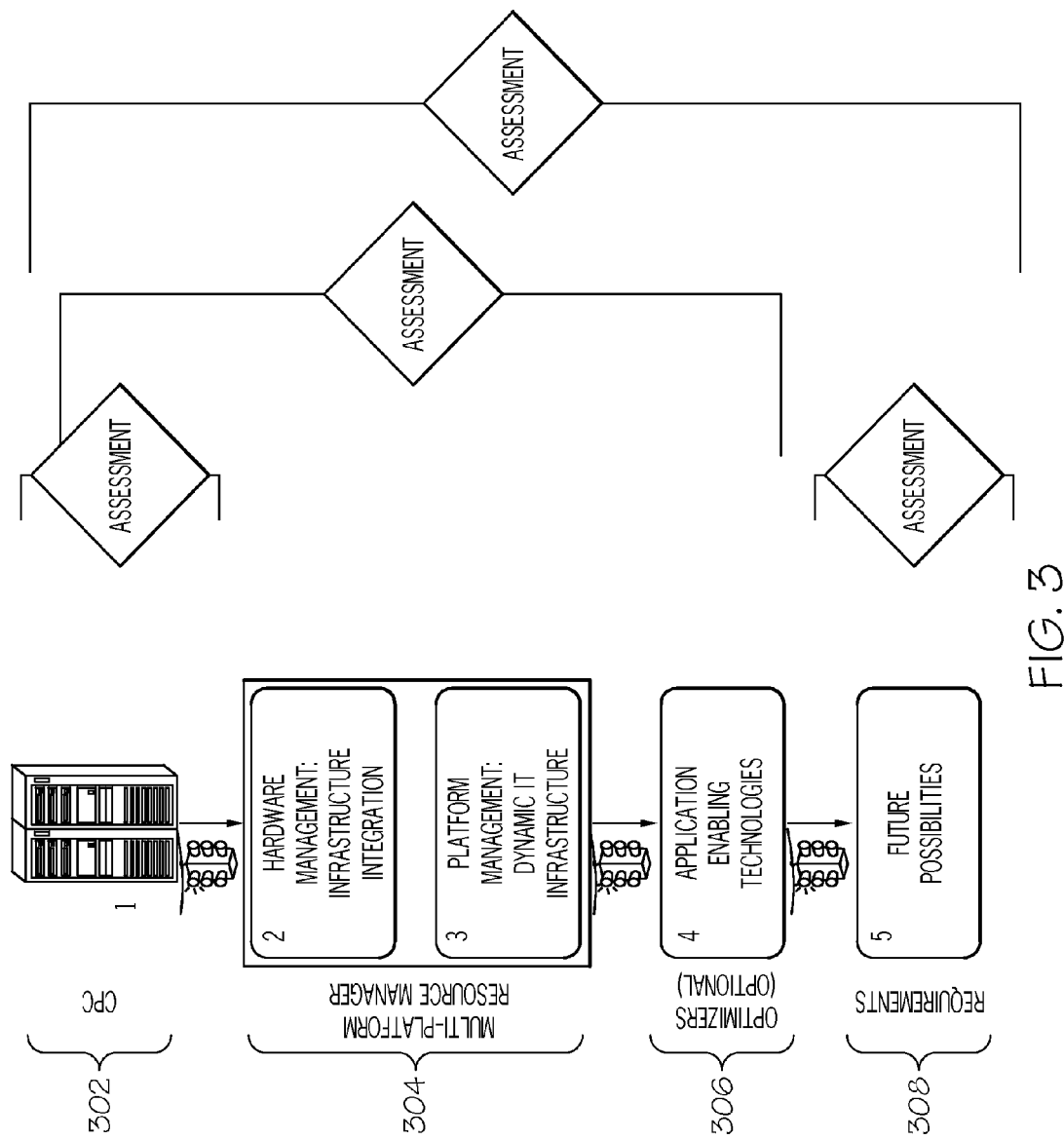
FIG. 3 depicts an exemplary high-level flow for configuring/optimizing an IT infrastructure.

With reference now to FIG. 3, an exemplary high-level flow chart for configuring/optimizing an IT infrastructure is presented. Depicted in FIG. 3 are four exemplary assessment points (shown as steps 1-4). These multiple assessment points provide flexibility in providing assessments of partial configurations (of the proposed IT configuration) in order to zero in on points that are of interest to different constituencies. In the example shown in FIG. 3, an assessment is made of a central process complex (CPC) CPC alone; the CPC in conjunction with the multi-platform resource manager (MPRM); the future requirements alone; and the complete vision (all of the above) for the IT infrastructure.

A first step 1 includes assessing an existing or proposed central processing complex (CPC) 302. CPC 302 denotes an architecture configuration attached through a channel subsystem to a set of devices or other architecture configurations.

In one embodiment, CPC 302 comprises loosely coupled complexes where each CPC is an architecture configuration that can include multiple instruction-stream engines and a set of shared or private devices such as tapes and modules. This assessment determines the need and/or feasibility of increasing workload performance, expanding workload capacity, extending system reliability, availability, and serviceability (RAS), and improving system efficiency. Once these parameters/needs are established, then an evaluation of a multi-platform resource manager 304 can be performed (steps 2 and 3). As depicted in step 2, assessing the hardware management function of the multi-platform resource manager 304 comprises evaluating multi-system provisioning/management of physical resources and virtual resources, multi-system monitoring, control and serviceability management, and multi-system energy monitoring, control and management. As represented by step 3, assessing the platform management comprises multi-architecture virtual server management, workload-based monitoring and reporting, and performance management. As represented by step 4, application enabling technologies can be assessed using optimizers 306. This assessment comprises evaluating integrated support for business intelligent services (e.g., service oriented architecture services). Finally, as depicted in step 5, non-CPC issues can be evaluated for future configurations/needs. This assessment comprises evaluating multi-system storage virtualization management, business continuity and resiliency controls, capacity upgrade on demand; capacity backup, energy management, image management, virtual server mobility and relocation, standards-based enterprise management application program interfaces, multi-architecture workload distribution and mobility, availability management, and business continuity.

Figure 4:
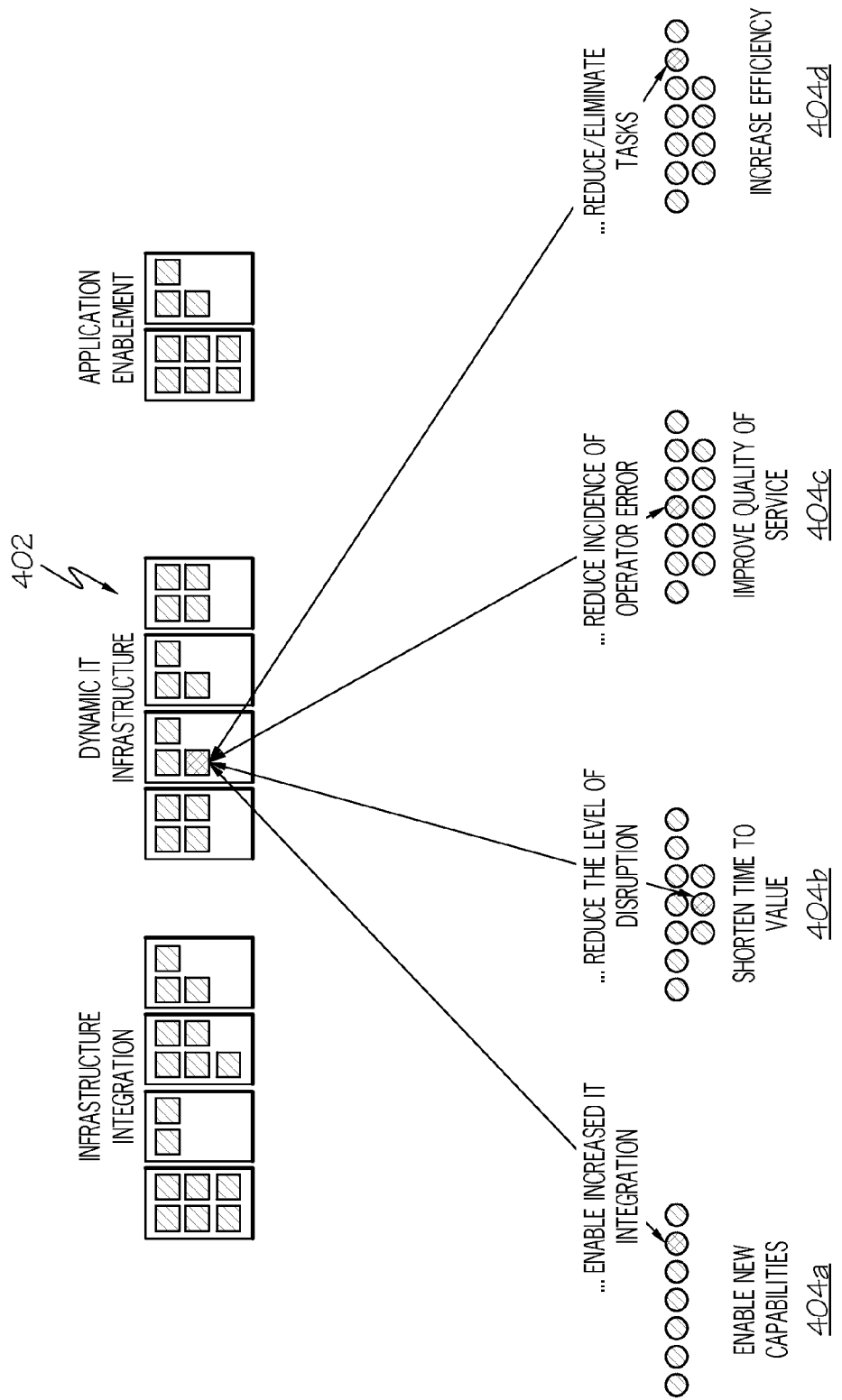
FIG. 4 illustrates a mapping of IT infrastructure components to customer-weighted attributes of an IT infrastructure.

In one embodiment, the assessments described in FIG. 3 are supported by mapping technology to attributes of an existing or proposed IT infrastructure. With reference now to FIG. 4, an exemplary mapping of IT infrastructure components to customer-weighted attributes of an IT infrastructure is presented. Components of an IT infrastructure 402 are mapped to specific attributes associated with the parameters shown in FIG. 2. That is, components of IT infrastructure 402 are now mapped to customer-weighted attributes 404*a-d* that were described above in graph 202 of FIG. 2. For example, a management module in the proposed IT infrastructure may be deemed to have the effect of enabling increased IT integration (part of attribute 404*a*), reducing the level of disruption caused by power failures (part of attribute 404*b*), reducing the incidence of operator errors (part of attribute 404*c*), and reducing/eliminating tasks associated with a specific workload (part of attribute 404*d*). These mappings provide a configuration tool with the ability to measure how many of these types of links (shown in FIG. 4) apply to a particular workload, and how strongly. In one embodiment, this initial mapping is industry-wide. That is, this initial mapping establishes a technology rule set. This technology rule set defines technology weights of an IT infrastructure by mapping capabilities of IT infrastructure components (402) to IT infrastructure attributes (404*a-d*) needed to execute a specific workload. Once this initial evaluation has been performed (utilizing the process described in FIGS. 3-4), a customer can then rate a set of assertions about how the proposed IT infrastructure could impact execution of a specific workload. Such a rating can be performed by taking the results of a questionnaire. In one embodiment, questions from these questionnaires are mapped to attributes of a candidate IT infrastructure.

Figure 5:
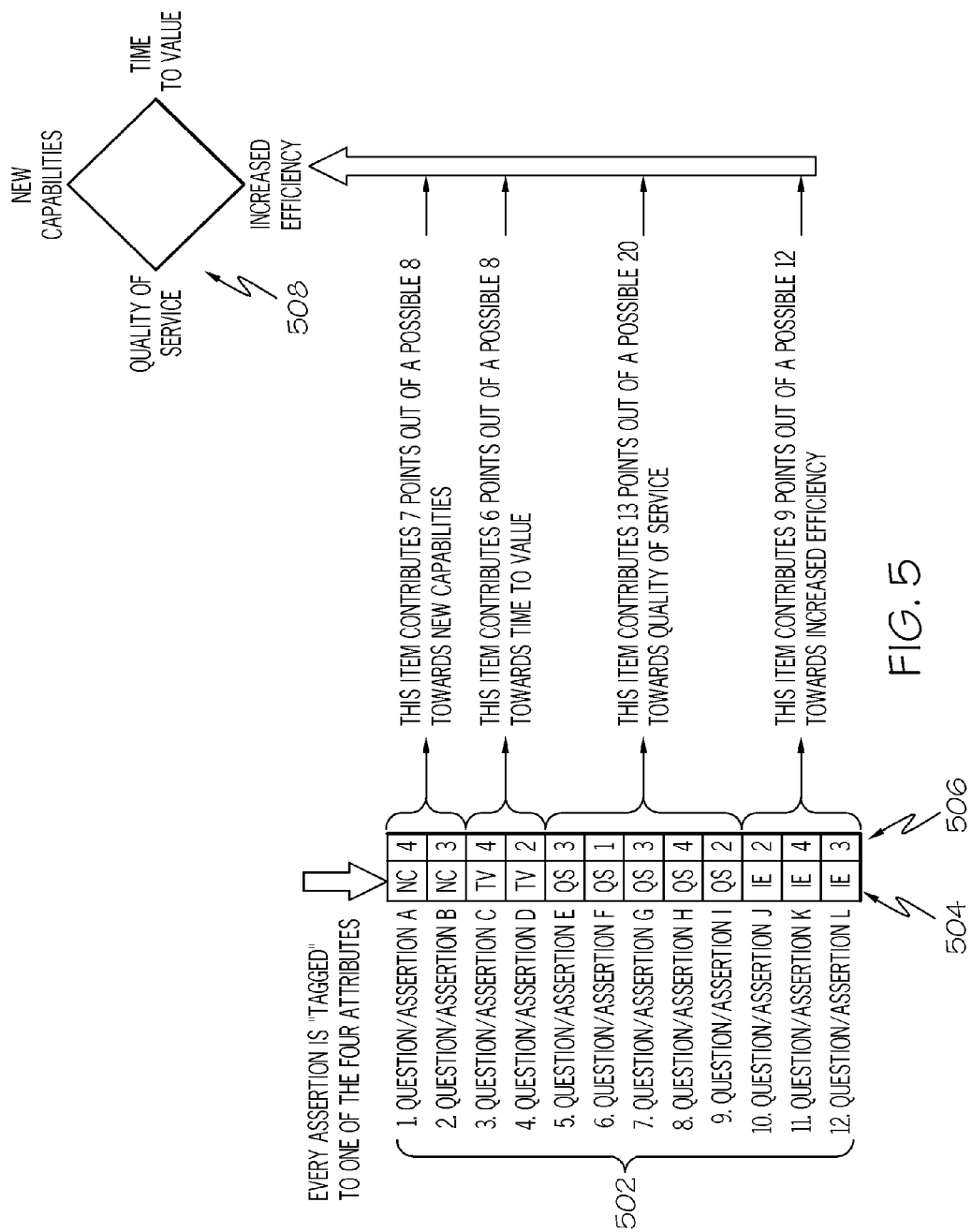
FIG. 5 depicts a mapping of questions from a customer questionnaire to attributes of an IT infrastructure.

Referring then to FIG. 5, a mapping of questions from a customer questionnaire to attributes of an IT infrastructure is presented. A questionnaire 502 includes multiple statements about various attributes of a component of a candidate IT infrastructure. For example, assume that the component is a platform performance manager (PPM) used to dynamically adjust system resources to help ensure that multi-architecture workloads meet service level agreement (SLA) goals within an enterprise priority policy. The customer is then asked, on a scale of 0-4, what his level of agreement is regarding various attributes of the PPM. For example, question/assertion A may ask the customer to rate, on a scale of 0-4, how strongly he agrees with the assertion that the PPM would enable increased IT integration by allowing IT to focus on end-to-end workload performance goals rather than the individual parts. In the example shown in column 506, the customer strongly agrees with this attribute assertion by giving the statement a "4". Note that this question/assertion A is mapped to the "New Capabilities" of the proposed/candidate IT infrastructure, as shown in column 504. As depicted in FIG. 5, the customer's responses to the various assertions (i.e., how much he agrees/disagrees with the assertions) are then summed up for each attribute category. These ratings are then used to create a customer-weighted attribute graph 508 by mapping both the technology weights (created in the process shown above in FIG. 4) with the customer responses to the questionnaire 502 shown in FIG. 5. This combined input results in a graph such as graph 602 shown in FIG. 6.

Figure 6:
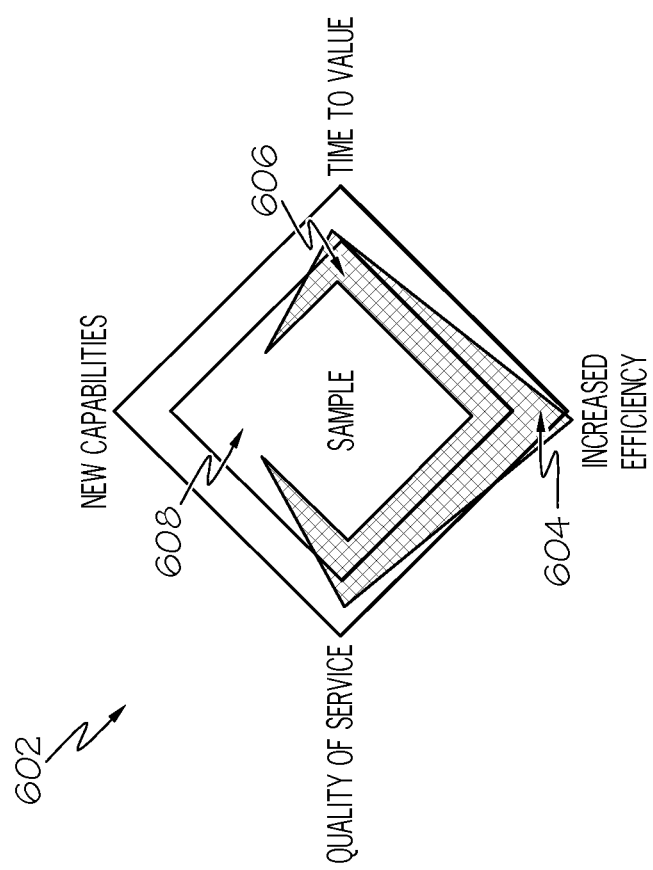
FIG. 6 illustrates a radar graph generated by comparing customer expectations with IT infrastructure system capabilities across multiple dimensions.

Referring now to FIG. 6, a radar graph 602, generated by comparing customer expectations with system capabilities across multiple dimensions, is depicted. Radar graph 602 shows how well a candidate IT infrastructure configuration will meet the needs of a specific workload, based on both the initial analysis (e.g., the technology weights derived in the process shown in FIG. 4) as well as the customer's opinions (derived in the process shown in FIG. 5). Thus, the IT consultant who is proposing the IT infrastructure and the customer both have a "say" in how well the candidate IT infrastructure will function in executing a specific workload. As depicted by region 604 of radar graph 602, the IT consultant and the customer both agree that the candidate IT infrastructure will provide excellent increased efficiency. Similarly, the time to value attribute is reasonably well met (region 606). However, new capabilities provided by the candidate IT infrastructure are poor (region 608), despite the fact that the customer thought that the PPM described above would have a very positive effect on the new capabilities of the candidate IT infrastructure. Region 608 can be lacking for various reasons. In one embodiment, the IT consultant may "know" (based on mappings described above and other technology rule sets) that the PPM described above will not have a beneficial effect on the new capabilities of the candidate IT infrastructure, despite what the customer may think. Thus, since the IT consultant's information and the customer's assessment are combined (e.g., by weighted multiplications of one against the other), the candidate IT infrastructure will not provide much in the way of new capabilities. A decision can then be made to proceed with deploying the candidate IT infrastructure (e.g., if the customer really doesn't care about this attribute), or else a new candidate IT infrastructure can be proposed/configured.

Figure 7:
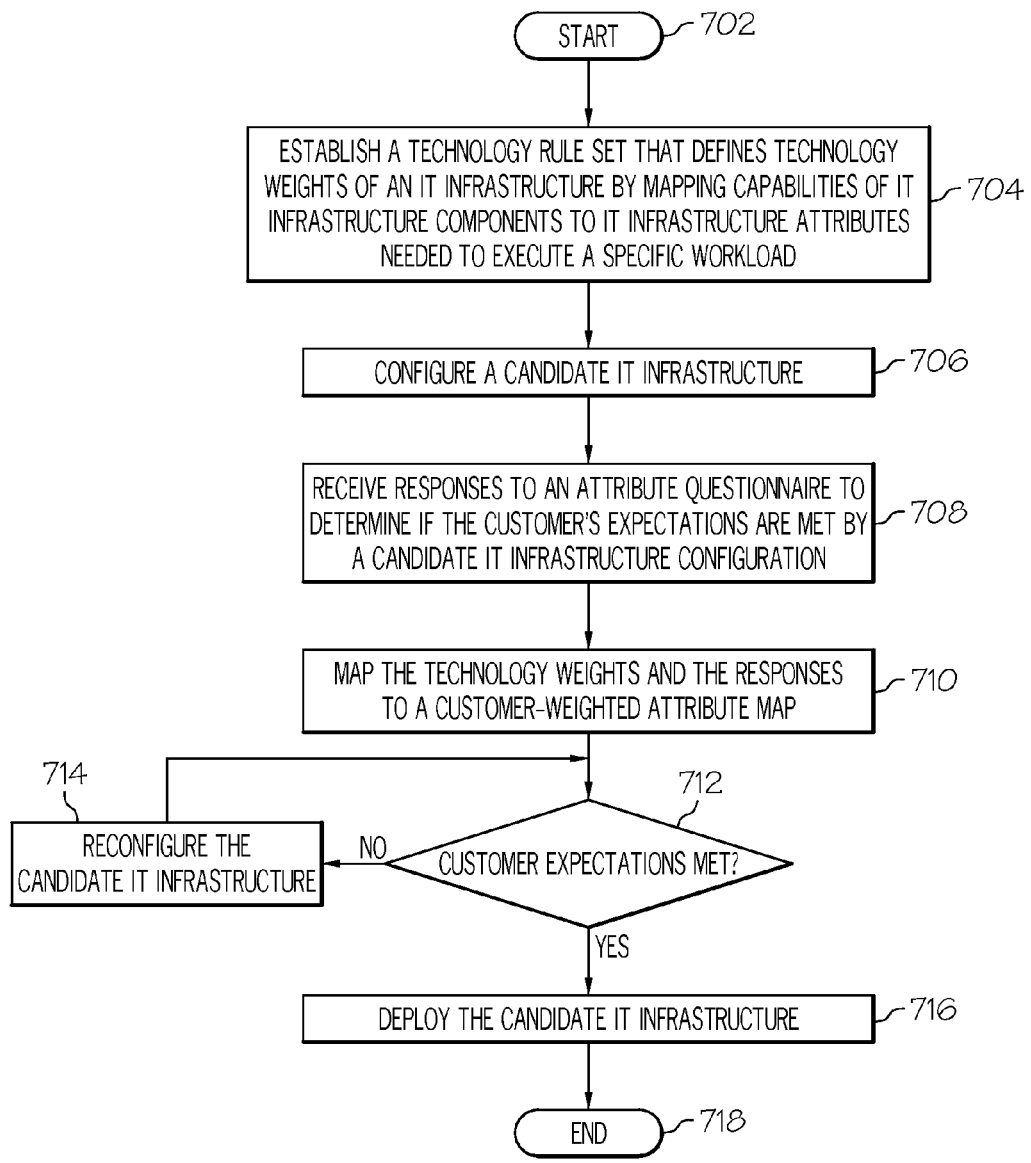
FIG. 7 is a high level flow chart of one or more exemplary steps taken by a processor to configure and/or optimize an IT infrastructure.

Referring now to FIG. 7, a high level flow chart of one or more exemplary steps taken by a processor to configure and/or optimize an IT system is presented. After initiator block 702, a technology rule set is established (block 704). This technology rule set defines technology weights of an IT infrastructure by mapping capabilities of IT infrastructure components to IT infrastructure attributes needed to execute a specific workload (e.g., as described in FIG. 4). A candidate IT infrastructure is then configured, using mapped components from the process depicted in block 704, for a specific workload (block 706).

Note that the candidate IT infrastructure can be optimized/configured in various ways. For example, the candidate IT infrastructure can be configured to minimize power consumption and to comply with external regulations during execution of the specific workload.

In one embodiment, the candidate IT infrastructure can be configured by modifying an existing IT infrastructure. In this embodiment, a request for needed IT components is issued. These needed IT components are part of the candidate IT infrastructure but are absent from the existing IT infrastructure. An order can then be issued to remove unnecessary IT components that are part of the existing IT infrastructure but are not part of the candidate IT infrastructure.

In one embodiment, the candidate IT infrastructure is configured by first fixing the specific workload to a set definition, and then adjusting a configuration of the candidate IT infrastructure until the candidate IT infrastructure is capable of executing the specific workload. In this embodiment, the workload is deemed the most important factor. In another embodiment, however, the IT infrastructure may be deemed more important (e.g., if workloads change). In this case, the candidate IT infrastructure is configured by first fixing an initial IT infrastructure configuration to a set definition, and then adjusting the specific workload until the initial IT infrastructure configuration is capable of executing the adjusted workload.

In one embodiment, the candidate IT infrastructure is configured by subdividing the candidate IT infrastructure across multiple IT providers until the candidate IT infrastructure is capable of executing the specific workload. In this embodiment, it is assumed that a single IT provider will not be able to optimally provide all of the necessary components to meet the needs of the customer. Thus, components of the candidate IT infrastructure are subdivided out until a level of granularity is reached to ensure that the optimal subcomponents are used in the IT infrastructure.

In one embodiment, the candidate IT infrastructure is configured by discarding existing IT resources from an existing IT infrastructure that do not meet the IT infrastructure attributes needed to execute the specific workload, thus resulting in an optimized and simpler IT infrastructure.

As described in block 708, responses, provided by a customer, to an attribute questionnaire are received (described in exemplary detail above in FIG. 5). These responses define a customer's level of agreement with the technology weights. That is, if the technology weight indicates that a particular component of a candidate IT infrastructure will be beneficial to accomplish function X, then the customer has the opportunity to state whether he agrees or disagrees, and to what degree. As depicted in the embodiment shown in FIG. 5, each question in the attribute questionnaire is mapped to an IT infrastructure attribute of the candidate IT infrastructure. The technology weights and the responses from the customer are then blended and mapped to a customer-weighted attribute map (block 710). This customer-weighted attribute map (shown in one example in FIG. 6) describes how closely the candidate IT infrastructure meets a customer's expectations for an IT infrastructure to execute the specific workload, and describes new capabilities, time to value, quality of service, and increased efficiency that will be provided by the candidate IT infrastructure.

If the candidate IT infrastructure fails to meet the customer's expectations (query block 712), then the candidate IT infrastructure is reconfigured (block 714) until the customer's expectations (e.g., assertion responses to the questionnaire shown in FIG. 5) are met. Once these expectations are met, the candidate IT infrastructure can be deployed (block 716), and the process ends (terminator block 718).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of optimizing a configuration of an information technology (IT) infrastructure, the computer implemented method comprising:
a processor establishing a technology rule set, wherein the technology rule set defines technology weights of an IT infrastructure by mapping capabilities of IT infrastructure components to IT infrastructure attributes needed to execute a specific workload;
the processor configuring a candidate IT infrastructure for executing the specific workload;
the processor receiving responses, provided by a customer, to an attribute questionnaire, wherein the responses define a customer's level of agreement with the technology weights, wherein each question in the attribute questionnaire is mapped to an IT infrastructure attribute of the candidate IT infrastructure, and wherein the IT infrastructure attribute comprises an attribute from a group consisting of an enablement of increased IT integration by use of the candidate IT infrastructure over the current IT infrastructure, a reduction in a level of disruption caused by power failures by use of the candidate IT infrastructure over the current IT infrastructure, a reduction in incidences of operator errors by use of the candidate IT infrastructure over the current IT infrastructure, and a reduction in tasks associated with the specific workload by use of the candidate IT infrastructure over the current IT infrastructure; and
in response to the processor determining that the candidate IT infrastructure fails to meet a customer's expectations, of the customer, for an IT infrastructure's performance abilities, reconfiguring the candidate IT infrastructure until the customer's expectations are met.

2. The computer implemented method of claim 1, further comprising:
in response to the processor determining that the candidate IT infrastructure meets the customer's expectations, deploying the candidate IT infrastructure.

3. The computer implemented method of claim 1, further comprising:
the processor mapping the technology weights and the responses to the attribute questionnaire to a customer-weighted attribute map, wherein the customer-weighted attribute map describes how closely the candidate IT infrastructure meets a customer's expectations for an IT infrastructure to execute the specific workload.

4. The computer implemented method of claim 3, wherein the customer-weighted attribute map describes new capabilities, time to value, quality of service and increased efficiency of the candidate IT infrastructure.

5. The computer implemented method of claim 1, further comprising:
optimizing the candidate IT infrastructure to minimize power consumption and to comply with external regulations during execution of the specific workload.

6. The computer implemented method of claim 1, further comprising:
the processor configuring the candidate IT infrastructure by modifying an existing IT infrastructure, wherein modifying the existing IT infrastructure is performed by the processor:
issuing a request for needed IT components, wherein the needed IT components are part of the candidate IT infrastructure but are absent from the existing IT infrastructure; and issuing an order to remove unnecessary IT components, wherein the unnecessary IT components are part of the existing IT infrastructure but are not part of the candidate IT infrastructure.

7. The computer implemented method of claim 1, further comprising:
the processor configuring the candidate IT infrastructure by:
fixing the specific workload to a set definition; and
adjusting a configuration of the candidate IT infrastructure until the candidate IT infrastructure is capable of executing the specific workload.

8. The computer implemented method of claim 1, further comprising:
the processor configuring the candidate IT infrastructure by:
fixing an initial IT infrastructure configuration to a set definition; and
adjusting the specific workload until the initial IT infrastructure configuration is capable of executing the adjusted workload.

9. The computer implemented method of claim 1, further comprising:
the processor configuring the candidate IT infrastructure by:
subdividing the candidate IT infrastructure across multiple IT providers until the candidate IT infrastructure is capable of executing the specific workload.

10. The computer implemented method of claim 1, further comprising:
the processor configuring the candidate IT infrastructure by discarding existing IT resources, from an existing IT infrastructure, that do not meet the IT infrastructure attributes needed to execute the specific workload.

11. A computer program product for optimizing a configuration of an information technology (IT) infrastructure, the computer program product comprising:
a computer readable storage media;
first program instructions to establish a technology rule set, wherein the technology rule set defines technology weights of an IT infrastructure by mapping capabilities of IT infrastructure components to IT infrastructure attributes needed to execute a specific workload;
second program instructions to receive responses, provided by a customer, to an attribute questionnaire, wherein the responses define a customer's level of agreement with the technology weights, wherein each question in the attribute questionnaire is mapped to an IT infrastructure attribute of a candidate IT infrastructure, and wherein the IT infrastructure attribute comprises an attribute from a group consisting of an enablement of increased IT integration by use of the candidate IT infrastructure over the current IT infrastructure, a reduction in a level of disruption caused by power failures by use of the candidate IT infrastructure over the current IT infrastructure, a reduction in incidences of operator errors by use of the candidate IT infrastructure over the current IT infrastructure, and a reduction in tasks associated with the specific workload by use of the candidate IT infrastructure over the current IT infrastructure; and
third program instructions to, in response to the processor determining that the candidate IT infrastructure fails to meet the customer's expectations, reconfigure the candidate IT infrastructure; and wherein
the first, second, and third program instructions are stored on the computer readable storage media.

12. The computer program product of claim 11, further comprising:
fourth program instructions to, in response to determining that the candidate IT infrastructure meets the customer's expectations, deploy the candidate IT infrastructure, and wherein
the fourth program instructions are stored on the computer readable storage media.

13. The computer program product of claim 11, further comprising:
fourth program instructions to map the technology weights and the responses to the attribute questionnaire to a customer-weighted attribute map, wherein the customer-weighted attribute map describes how closely the candidate IT infrastructure meets a customer's expectations for an IT infrastructure configuration to execute the specific workload, and wherein the fourth program instructions are stored on the computer readable storage media.

14. The computer program product of claim 13, wherein the customer-weighted attribute map describes new capabilities, time to value, quality of service and increased efficiency of the candidate IT infrastructure.

15. The computer program product of claim 11, further comprising:
fourth program instructions to optimize the candidate IT infrastructure to minimize power consumption and to comply with external regulations during execution of the specific workload, and wherein
the fourth program instructions are stored on the computer readable storage media.

16. A computer system comprising:
a central processing unit (CPU), a computer readable memory, and a computer readable storage media;
first program instructions to establish a technology rule set, wherein the technology rule set defines technology weights of an IT infrastructure by mapping capabilities of IT infrastructure components to IT infrastructure attributes needed to execute a specific workload;
second program instructions to receive responses, provided by a customer, to an attribute questionnaire, wherein the responses define a customer's level of agreement with the technology weights, wherein each question in the attribute questionnaire is mapped to an IT infrastructure attribute of a candidate IT infrastructure, and wherein the IT infrastructure attribute comprises an attribute from a group consisting of an enablement of increased IT integration by use of the candidate IT infrastructure over the current IT infrastructure, a reduction in a level of disruption caused by power failures by use of the candidate IT infrastructure over the current IT infrastructure, a reduction in incidences of operator errors by use of the candidate IT infrastructure over the current IT infrastructure, and a reduction in tasks associated with the specific workload by use of the candidate IT infrastructure over the current IT infrastructure; and
third program instructions to, in response to the processor determining that the candidate IT infrastructure fails to meet the customer's expectations, reconfigure the candidate IT infrastructure; and wherein
the first, second, and third program instructions are stored on the computer readable storage media for execution by the processor via the computer readable memory.

17. The computer system of claim 16, further comprising:
fourth program instructions to, in response to determining that the candidate IT infrastructure meets the customer's expectations, deploy the candidate IT infrastructure, and wherein
the fourth program instructions are stored on the computer readable storage media for execution by the processor via the computer readable memory.

18. The computer system of claim 16, further comprising:
fourth program instructions to map the technology weights and the responses to the attribute questionnaire to a customer-weighted attribute map, wherein the customer-weighted attribute map describes how closely the candidate IT infrastructure meets a customer's expectations for an IT infrastructure configuration to execute the specific workload, and wherein the fourth program instructions are stored on the computer readable storage media for execution by the processor via the computer readable memory.

19. The computer system of claim 18, wherein the customer-weighted attribute map describes new capabilities, time to value, quality of service and increased efficiency of the candidate IT infrastructure.

20. The computer system of claim 16, further comprising:
fourth program instructions to optimize the candidate IT infrastructure to minimize power consumption and to comply with external regulations during execution of the specific workload, and wherein
the fourth program instructions are stored on the computer readable storage media for execution by the processor via the computer readable memory.

* * * * *